United States Patent
Coyle et al.

(10) Patent No.: US 9,436,743 B1
(45) Date of Patent: Sep. 6, 2016

(54) SYSTEMS AND METHODS FOR EXPANDING SEARCH RESULTS

(71) Applicant: Symantec Corporation, Mountain View, CA (US)

(72) Inventors: Michael Coyle, Los Altos, CA (US); Rohit Dinakar, Sunnyvale, CA (US); Virali Sheth, Milpitas, CA (US)

(73) Assignee: Veritas Technologies LLC, Mountain View, CA (US)

( * ) Notice: Subject to any disclaimer, the term of this patent is extended or adjusted under 35 U.S.C. 154(b) by 162 days.

(21) Appl. No.: 14/229,398

(22) Filed: Mar. 28, 2014

(51) Int. Cl.
*G06F 17/30* (2006.01)

(52) U.S. Cl.
CPC ............... *G06F 17/30554* (2013.01)

(58) Field of Classification Search
None
See application file for complete search history.

(56) References Cited

U.S. PATENT DOCUMENTS

| | | | |
|---|---|---|---|
| 6,128,365 A * | 10/2000 | Bechwati | G06K 9/00771 378/4 |
| 6,226,641 B1 * | 5/2001 | Hickson | G06F 21/6218 |
| 6,877,135 B1 * | 4/2005 | Kamiwada | G06F 3/0482 707/999.003 |
| 8,090,722 B2 * | 1/2012 | Krishnaprasad .. | G06F 17/30011 707/741 |
| 9,129,036 B2 * | 9/2015 | Dexter | G06F 17/30938 |
| 2006/0103534 A1 * | 5/2006 | Arms | E01F 13/12 340/572.1 |
| 2006/0149710 A1 * | 7/2006 | Koningstein | G06F 17/30867 |
| 2008/0040505 A1 * | 2/2008 | Britto | G06F 3/0608 709/238 |
| 2008/0235210 A1 * | 9/2008 | Krishnaprasad .. | G06F 17/30011 |
| 2009/0070301 A1 | 3/2009 | McLean et al. | |
| 2010/0309196 A1 * | 12/2010 | Castleman | G06T 13/80 345/418 |
| 2013/0013596 A1 * | 1/2013 | Wang | G06F 17/3064 707/728 |
| 2014/0193039 A1 * | 7/2014 | Wexler | G01C 11/04 382/106 |
| 2015/0016712 A1 * | 1/2015 | Rhoads | G06K 9/00208 382/154 |
| 2015/0172843 A1 * | 6/2015 | Quan | G06F 3/162 381/18 |

OTHER PUBLICATIONS

Michael Coyle, et al; Systems and Methods for Displaying Search Results; U.S. Appl. No. 14/506,300, filed Oct. 3, 2014.
Michael Coyle, et al; Systems and Methods for Displaying Search Results; U.S. Appl. No. 14/562,038, filed Dec. 5, 2014.
"Autonomy eDiscovery", http://www.ndm.net/archiving/HP-Autonomy/autonomy-ediscovery, as accessed Oct. 9, 2014, (Nov. 12, 2012).
"Nuix", http://www.nuix.com/, as accessed Oct. 9, 2014, (Jan. 7, 2007).
"Data structure", http://en.wikipedia.org/wiki/Data_structure, as accessed Oct. 9, 2014, (Dec. 4, 2003).
"eDiscovery", http://www.autonomy.com/offerings/ediscovery/, as accessed Aug. 28, 2014, Hewlett-Packard Development Company. L.P., (Sep. 22, 2013).

(Continued)

*Primary Examiner* — Hung Le
(74) *Attorney, Agent, or Firm* — ALG Intellectual Property, LLC

(57) ABSTRACT

A computer-implemented method for expanding search results may include (1) identifying, within results of a search, a document that is a member of a document family that includes another document (or multiple other documents), (2) determining that a user has made a selection to include the document family within the results of the search, (3) creating a data map that includes a representation of the document identified within the results of the search, (4) expanding the data map by including, within the data map, a representation of each of the other documents in the document family based on the determination that the user made the selection, and (5) using the expanded data map to include the document family within the results of the search. Various other methods, systems, and computer-readable media are also disclosed.

20 Claims, 11 Drawing Sheets

(56) References Cited

OTHER PUBLICATIONS

"Enterprise eDiscovery", http://www.nuix.com/enterprise-ediscovery, as accessed Aug. 28, 2014, Nuix, (Oct. 7, 2013).
"Identity provider", http://en.wikipedia.org/wiki/Identity_provider, as accessed Aug. 28, 2014, Wikipedia, (Mar. 15, 2012).
"What does value & 0xff do in Java?", http://stackoverflow.com/questions/11380062/what-does-value-0xff-do-in-java, as accessed Aug. 28, 2014, (Jul. 8, 2012).
"Search returns results that do not match some required keywords", http://community.ebay.com/t5/Search/Search-returns-results-that-do-not-match-some-required-keywords/td-p/2993976, as accessed Feb. 5, 2014, The eBay Community, (Feb. 26, 2013).
"Relativity", http://kcura.com/relativity/, as accessed Feb. 5, 2014, kCura, (Aug. 26, 2009).
Michael Coyle, et al.; Systems and Methods for Expanding Search Results; U.S. Appl. No. 14/229,119, filed Mar. 28, 2014.

* cited by examiner

SYSTEMS AND METHODS FOR EXPANDING SEARCH RESULTS

CROSS REFERENCE TO RELATED APPLICATION

This application incorporates by reference the entirety of U.S. application Ser. No. 14/229,119 by Michael Coyle, Rohit Dinakar, Virali Sheth, and Nelson Wiggins, and titled Systems and Methods for Expanding Search Results, filed on 28 Mar. 2014.

BACKGROUND

When a user performs a search for documents within a database, a search engine may analyze and/or filter the documents within the database to provide the most relevant results. Some documents returned to the user may be part of a family of related documents, such as a file embedded within another file or an email with corresponding email attachments.

Traditional search engines may only return documents that exactly match the search criteria entered by the user. Documents that are associated with found documents but do not match the search criteria themselves may not be included within the search results. These related documents may provide additional context and/or relevant information regarding the user's search, but unfortunately they may not be made available to the user.

In other examples, some search engines may always return the entire document families of documents found in the search, regardless of whether the user wishes to view them. This may result in broad, cluttered search results that are similarly unhelpful to the user. Accordingly, the instant disclosure identifies a need for improved methods for searching documents.

SUMMARY

As will be described in greater detail below, the instant disclosure describes various systems and methods for expanding search results by, for example, allowing a user to include, within results of a search, entire document families associated with documents found in the search. In one example, a computer-implemented method for expanding search results may include (1) identifying, within results of a search, a document that is a member of a document family that includes another document (or multiple other documents), (2) determining that a user has made a selection to include the document family within the results of the search, (3) creating a data map that includes a representation of the document identified within the results of the search, (4) expanding the data map by including, within the data map, a representation of each of the other documents in the document family based on the determination that the user made the selection, and (5) using the expanded data map to include the document family within the results of the search.

In some examples, determining that the user made the selection to include the document family in the results of the search may include determining that the user made the selection to include each document family that includes any document found in the search before performing the search. In these examples, expanding the data map may involve including, within the data map, each document family that includes any document found in the search. Additionally, in these examples, using the expanded data map to include the document family within the results of the search may involve including, within the results of the search, each document family represented on the data map.

In some embodiments, determining that the user has made the selection to include the document family in the results of the search may include determining that a search result represents a partial document family and determining that the user has selected to expand the partial document family after performing the search. In such embodiments, the document family may include the partial document family.

In some examples, expanding the data map may include creating an additional data map that includes a representation of each document identified within the results of the search. In these examples, expanding the data map may also include combining the expanded data map and the additional data map to create a combined data map that includes a representation of each document within each document family that contains any document within the results of the search. In these examples, combining the data map and the additional data map may include performing a bitwise OR operation on the data map and the additional data map. Additionally, in these examples, using the data map to include the document family within the results of the search may include updating the results of the search by including, within the results of the search, each document represented in the combined data map.

In some embodiments, creating the data map may include identifying a unique identifier associated with the document that corresponds to an offset within the data map. In such embodiments, creating the data map may also include representing the document by toggling a bit at the corresponding offset on the data map.

In some examples, expanding the data map may include identifying each of the other documents within the document family and identifying, for each of the other documents, a unique identifier that corresponds to an offset within the data map. In these examples, expanding the data map may also include toggling a bit at the corresponding offset for each of the other documents within the document family.

In one embodiment, a system for implementing the above-described method may include (1) an identification module that identifies, within results of a search, a document that is a member of a document family that includes another document (or multiple other documents), (2) a determination module that determines that a user has made a selection to include the document family within the results of the search, (3) a creation module that creates a data map that includes a representation of the document identified within the results of the search, (4) an expansion module that expands the data map by including, within the data map, a representation of each of the other documents in the document family based on the determination that the user made the selection, (5) an inclusion module that uses the expanded data map to include the document family within the results of the search, and (6) at least one processor that executes the identification module, the determination module, the creation module, the expansion module, and the inclusion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, within results of a search, a document that is a member of a document family that includes another document (or multiple other documents), (2) determine that a user has made a selection to include the document family within the results of the search, (3) create a data map that includes a representation of the document identified within the results of the search, (4) expand the data map by including, within the data map, a representation of each of the other documents in the document family based on the determination that the user made the selection, and (5) use the expanded data map to include the document family within the results of the search.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
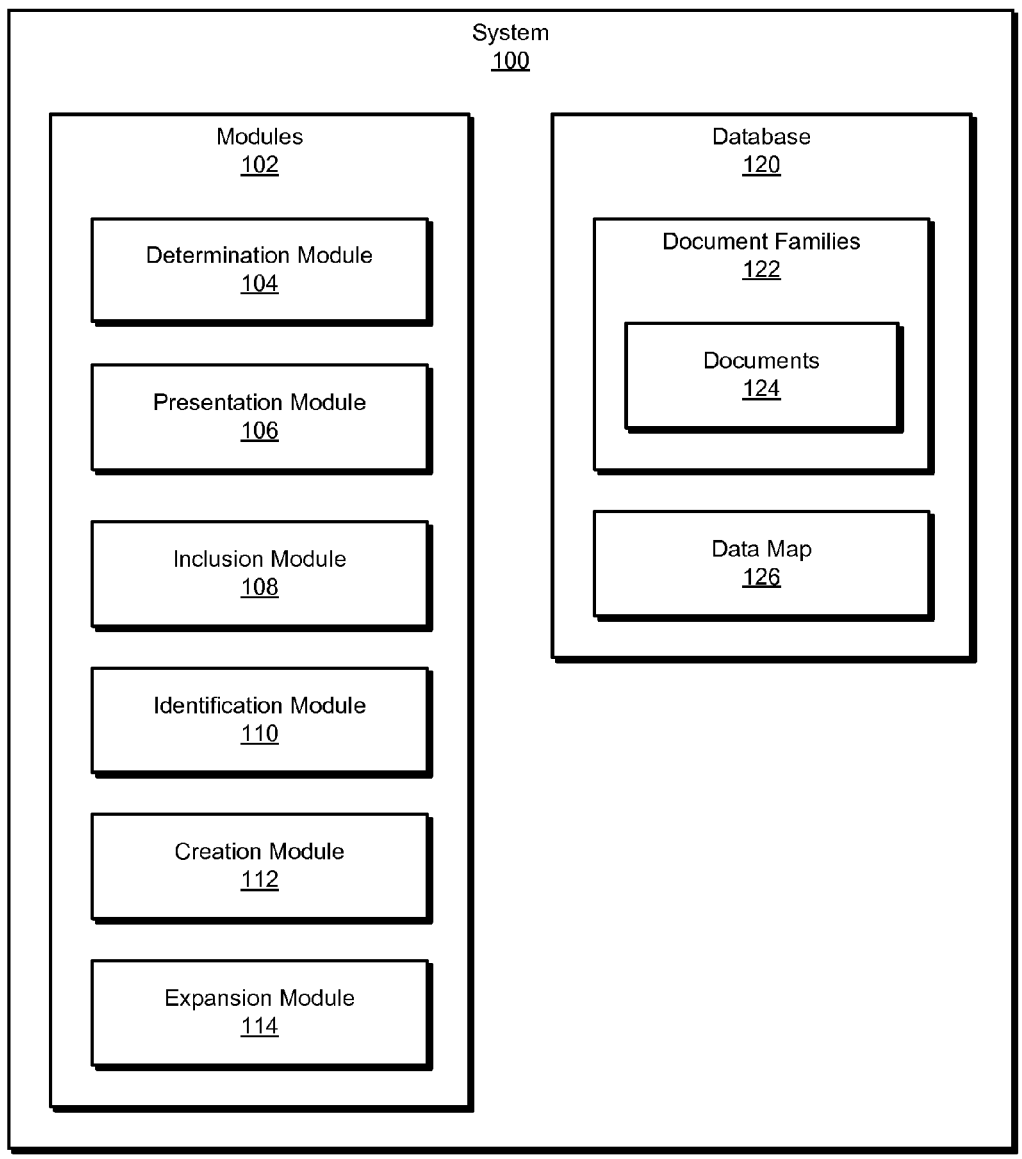
FIG. 1 is a block diagram of an exemplary system for expanding search results.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for expanding search results. As will be explained in greater detail below, by allowing a user to view all document families associated with found documents, the disclosed systems and methods may provide more comprehensive, robust search results. In addition, the disclosed systems and methods may allow a user to customize and enhance results of a search by giving users the option to expand individual document families. In general, the disclosed systems and methods provide increased flexibility and user control in order to optimize the documents displayed to a user as the results of a search.

Figure 2:
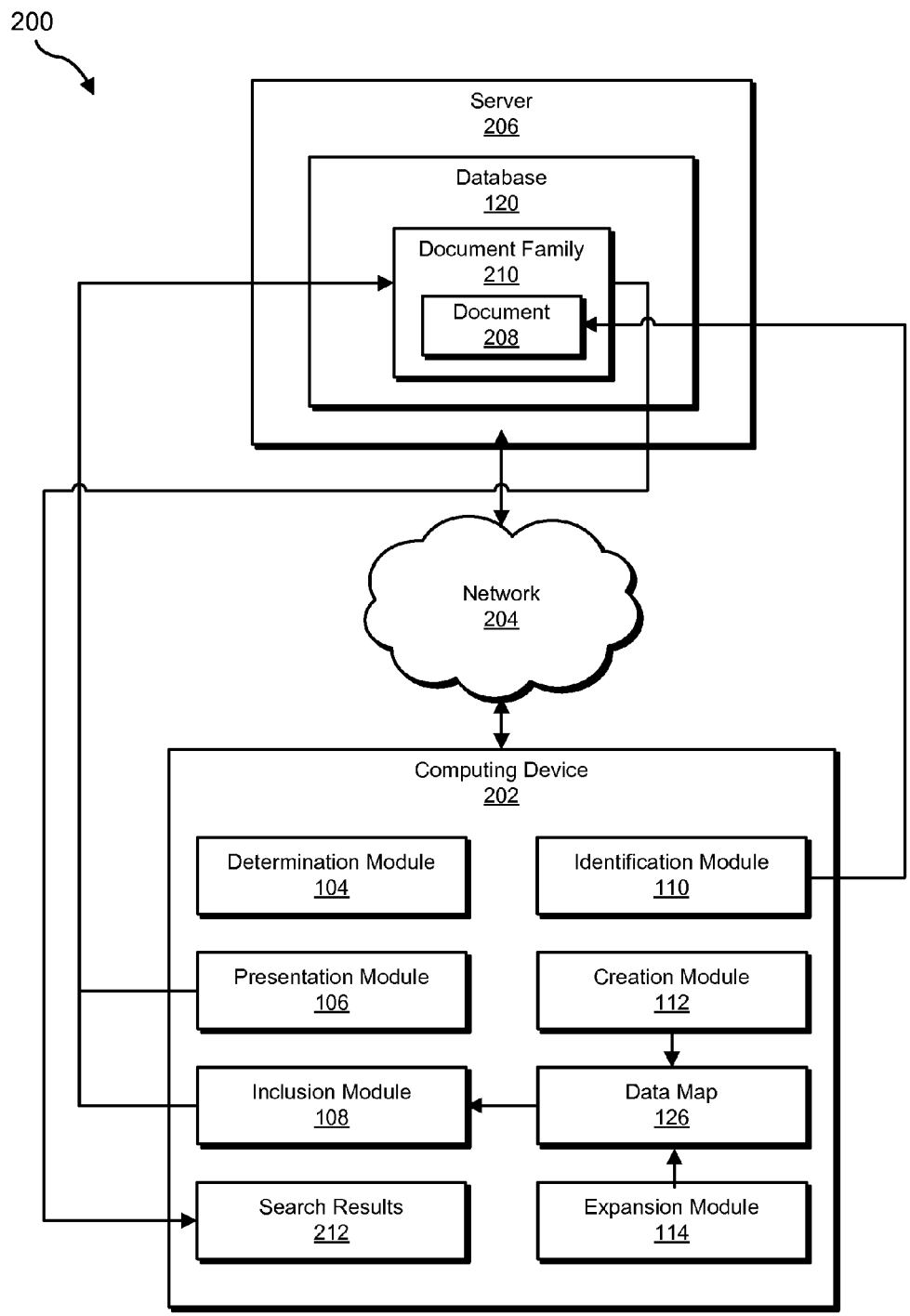
FIG. 2 is a block diagram of an additional exemplary system for expanding search results.

The following will provide, with reference to FIGS. 1-2, detailed descriptions of exemplary systems for expanding search results. Detailed descriptions of corresponding computer-implemented methods will also be provided in connection with FIGS. 3-9. In addition, detailed descriptions of an exemplary computing system and network architecture capable of implementing one or more of the embodiments described herein will be provided in connection with FIGS. 10 and 11, respectively.

FIG. 1 is a block diagram of an exemplary system 100 for expanding search results. As illustrated in this figure, exemplary system 100 may include one or more modules 102 for performing one or more tasks. In one embodiment, and as will be explained in greater detail below, exemplary system 100 may include a determination module 104 that determines that a user is attempting to perform a document search. Exemplary system 100 may also include a presentation module 106 that presents an option to the user to include, within results of the search, a document family associated with a found document. In addition, determination module 104 may determine that the user has selected to include the document family associated with the document. Exemplary system 100 may also include an inclusion module 108 that includes the document family in the search results in response to determining that the user has selected to include the document family associated with the document.

In the same or an additional embodiment, and as will be explained in greater detail below, exemplary system 100 may include an identification module 110 that identifies, within results of a search, a document that is a member of a document family that includes another document (or multiple other documents). In this embodiment, determination module 104 may then determine that a user has made a selection to include the document family within the results of the search. Furthermore, exemplary system 100 may include a creation module 112 that creates a data map that includes a representation of the document identified within the results of the search. Exemplary system 100 may also include an expansion module 114 that expands the data map by including, within the data map, a representation of each of the other documents in the document family based on the determination that the user made the selection. Finally, inclusion module 108 may use the expanded data map to include the document family within the results of the search. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1010 in FIG. 10, and/or portions of exemplary network architecture 1100 in FIG. 11. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store document families 122. In some examples, each of document families 122 may contain one or more of documents 124, which may also be stored in database 120. In general, database 120 may be configured to store any collection of document families and/or independent documents that may be analyzed and displayed to a user in response to the user performing a search.

The term "document family," as used herein, generally refers to any group of files, messages, and/or stored data that are related through attachment (e.g., email attachment), embedding (e.g., content embedded within a parent document), and/or reference. For example, a document family may include an email and attachments distributed via the email. In another example, a document family may include a file and any files embedded within the file. Moreover, as used herein, the term "document" generally refers to any file or data unit that contains readable text for document review purposes, including emails and other readable documents. In exemplary embodiments, the disclosed systems and methods may operate in the context of a document review and/or e-discovery platform.

In addition, database 120 may be configured to store data map 126. The term "data map," as used herein, generally refers to any digital representation of discrete sets of information, where different locations (e.g., offsets) within the data map correspond to different ones of the discrete sets of information. For example, a data map may be used to store the pixel values of each pixel within an image. In addition, a data map may represent documents (such as one or more of documents 124) that are displayed to a user as the results of a search. Notably, bitmaps may represent each piece of information with a single bit, although data maps may represent each piece of information with any number of bits. Moreover, the term "data map," as used herein, need not assign the same number of bits to each document and/or need not assign a document to every bit or section of the data map. Furthermore, data map 126 may record multiple properties for a single document (e.g., using multiple bits), and not just the property of existence or presence (i.e., within search results, as discussed below).

Database 120 may represent portions of a single database or computing device or a plurality of databases or computing devices. For example, database 120 may represent a portion of server 206 in FIG. 2, computing system 1010 in FIG. 10, and/or portions of exemplary network architecture 1100 in FIG. 11. Alternatively, database 120 in FIG. 1 may represent one or more physically separate devices capable of being accessed by a computing device, such as server 206 in FIG. 2, computing system 1010 in FIG. 10, and/or portions of exemplary network architecture 1100 in FIG. 11.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, modules 102 may reside client-side on computing device 202 in order to facilitate a user of computing device 202 searching for documents within database 120. In this example, database 120 may reside server-side on server 206. In other examples, however, all or a part of modules 102 may reside server-side. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to expand search results. For example, and as will be described in greater detail below, one or more of modules 102 may cause computing device 202 and/or server 206 to determine that a user is attempting to perform a document search. One or more of modules 102 may also cause computing device 202 and/or server 206 to present an option to the user to include, within search results 212, a document family 210 associated with a found document 208. In addition, one or more of modules 102 may cause computing device 202 and/or server 206 to determine that the user has selected to include document family 210 associated with document 208. Furthermore, one or more of modules 102 may cause computing device 202 and/or server 206 to include document family 210 in search results 212 in response to determining that the user has selected to include document family 210 associated with document 208.

In the same or an additional embodiment, one or more of modules 102 may, when executed by at least one processor of computing device 202 and/or server 206, cause computing device 202 and/or server 206 to expand search results. For example, and as will be described in greater detail below, one or more of modules 102 may cause computing device 202 and/or server 206 to identify, within search results 212, document 208 that is a member of document family 210 that includes another document (or multiple other documents). One or more of modules 102 may also cause computing device 202 and/or server 206 to determine that a user has made a selection to include document family 210 within search results 212. In addition, one or more of modules 102 may cause computing device 202 and/or server 206 to create data map 126 that includes a representation of document 208 identified within search results 212. Furthermore, one or more of modules 102 may cause computing device 202 and/or server 206 to expand data map 126 by including, within data map 126, a representation of each of the other documents in document family 210 based on the determination that the user made the selection. Finally, one or more of modules 102 may cause computing device 202 and/or server 206 to use expanded data map 126 to include document family 210 within search results 212.

In the example of FIG. 2, a user may perform a document search and optionally include entire document families within search results 212. In some embodiments, the user may select to include, within search results 212, all document families associated with documents found in the search. For example, the user may select to include all the document families prior to performing the search. Alternatively, a user may select to update search results 212 with all the document families after performing the search. In other examples, the user may select to expand one or more individual document families after performing the search.

In some embodiments, expanding search results 212 may include creating data map 126. For example, if a user selects to include all the document families associated with documents found in the search before performing the search, data map 126 may first be created to represent each of the documents that match search criteria entered by the user. Data map 126 may then be expanded to include the document families associated with the matching documents and search results 212 may be displayed to the user as each document represented in expanded data map 126. In addition, if a user selects one or more documents for which to include the associated document family after performing the search, data map 126 may be created to represent each selected document. Data map 126 may then be expanded to include representations of each requested document family and then combined with an additional data map that represents each existing search result. Finally, search results 212 may be displayed to the user to indicate each document represented in the combined data map.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1010 in FIG. 10, or any other suitable computing device.

Server 206 generally represents any type or form of computing device that is capable of storing, processing, managing, producing, and/or expanding search results. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1100 in FIG. 11, or the like. Network 204 may facilitate communication or data transfer using wireless or wired connections. In one embodiment, network 204 may facilitate communication between computing device 202 and server 206.

Figure 3:
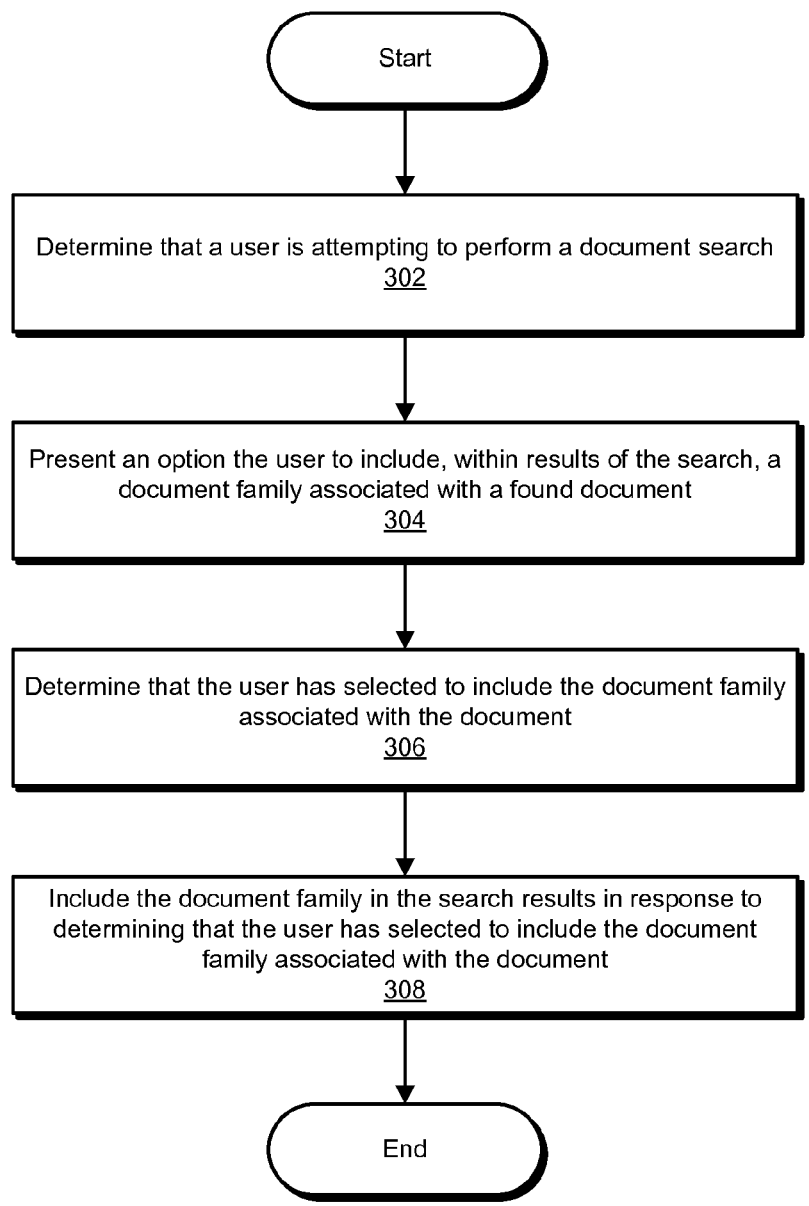
FIG. 3 is a flow diagram of an exemplary method for expanding search results.

FIG. 3 is a flow diagram of an exemplary computer-implemented method 300 for expanding search results. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1010 in FIG. 10, and/or portions of exemplary network architecture 1100 in FIG. 11.

As illustrated in FIG. 3, at step 302 one or more of the systems described herein may determine that a user is attempting to perform a document search. For example, determination module 104 may, as part of computing device 202 in FIG. 2, determine that a user is attempting to perform a document search.

Determination module 104 may determine that a user is attempting to perform a document search in a variety of ways. In one example, determination module 104 may determine that the user is attempting to perform the search by receiving input, such as a search query, indicating that the user is attempting to perform the search. For example, determination module 104 may determine that the user is attempting to search for documents within database 120. In some examples, determination module 104 may determine that the user is attempting to perform the document search before the user performs the search, such as by determining that the user has accessed a search engine and/or by determining that the user has entered search criteria into an input field within a graphical user interface ("GUI") of the search engine but has not yet directed the search engine to complete the search. In these examples, determination module 104 may determine that the user is attempting to perform the search before search results 212 are displayed to the user. Additionally or alternatively, determination module 104 may determine that the user has already performed the search and that search results 212 have already been displayed to the user.

Returning to FIG. 3, at step 304 one or more of the systems described herein may present an option to the user to include, within results of the search, a document family associated with a found document. For example, presentation module 106 may, as part of computing device 202 in FIG. 2, present an option to the user to include, within search results 212, document family 210 associated with document 208.

The systems described herein may present the option to the user to include the document family in a variety of ways. In some examples, if determination module 104 determined that the user is attempting to perform the search before the user has completed the search, presentation module 106 may also present the option to the user before the user has completed the search. For example, presentation module 106 may display a prompt to the user allowing the user to choose to include, within search results 212, each document family associated with each search result. In other embodiments, presentation module 106 may present the option at any time to the user (e.g., upon user request or access of options and/or settings), without an indication that the user is (or will be) attempting to perform a search (e.g., without step 302 being performed yet). Presentation module 106 may present the option in a search portal and/or search menu, either of which may be displayed within one or more GUI windows, for example.

Figure 4:
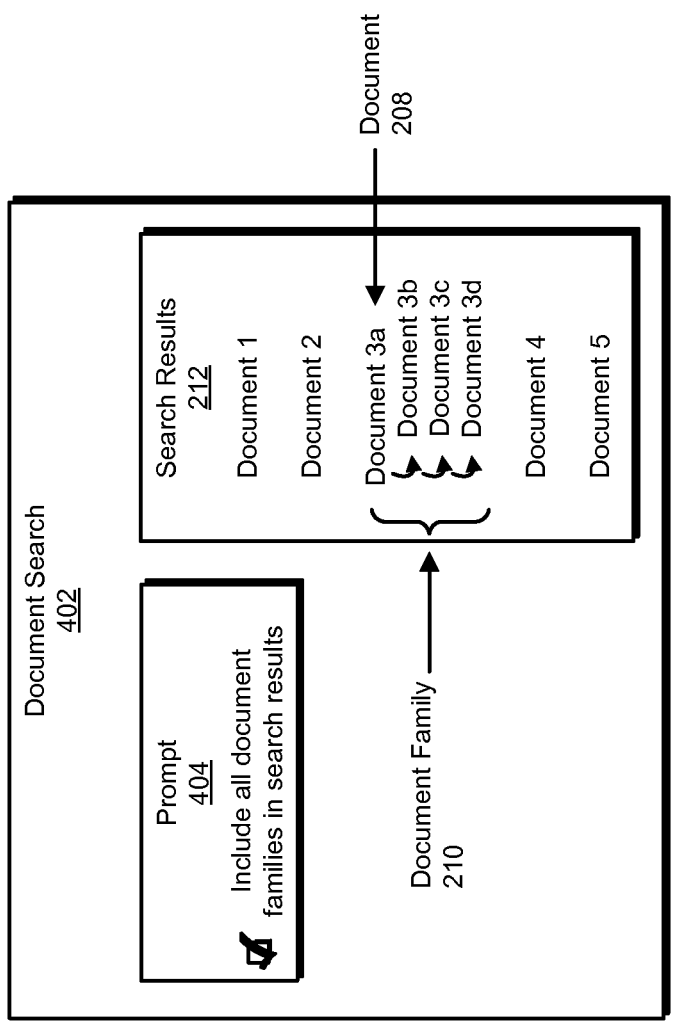
FIG. 4 is an illustration of an exemplary document search.

FIG. 4 illustrates an exemplary document search 402. In this example, prompt 404 is displayed to the user before the user performs the search. As shown in FIG. 4, search results 212 may include both document 208 and the larger document family 210. The user may indicate, such as by checking a box in prompt 404, that the user would like to include all the document families in search results 212.

The term "prompt," as used herein, generally refers to any type or form of notification, message, and/or alert presented to a user. Prompts may be displayed in any of a variety of forms, such as pop-up notifications and/or text rendered within a web page or search engine GUI. In addition, and as will be described in greater detail below, prompts may perform a variety of functions, such as notifying a user that document families are missing from search results and/or notifying a user that search results have been updated with new documents. Furthermore, prompts may be interactive, such as by allowing a user to indicate (e.g., by checking a box, clicking a button, etc.) that the user wishes to include one or more document families within the search results, refresh search results, and/or perform any other action related to performing a document search.

In some embodiments, if the user did not choose to include all the document families in search results 212 prior to completing the search, determination module 104 may complete the search normally (i.e., without including document family 210 in search results 212) and/or direct a search engine used to perform the search to complete the search normally. Then, determination module 104 may analyze search results 212 and determine that one partial document family (or multiple partial document families) was included in search results 212. The term "partial document family," as used herein, generally refers to items in search results 212 that reference a document (or multiple documents), but not all documents, included within the document family.

In response to determining that search results 212 include the partial document family, presentation module 106 may display a prompt to the user indicating that the partial document family was included in search results 212. Similarly, presentation module 106 may display a prompt to the user enabling the user to expand the partial document family by including, within search results 212, an entire document family associated with the partial document family.

In some examples, presentation module 106 may enable the user to simultaneously expand each partial document family included within search results 212. For example, if determination module 104 determined that search results 212 include five partial document families, presentation module 106 may display a prompt to the user notifying the user that five partial document families are included within search results 212. Additionally or alternatively, presentation module 106 may display a prompt to the user allowing the user to expand all five partial document families.

Figure 5:
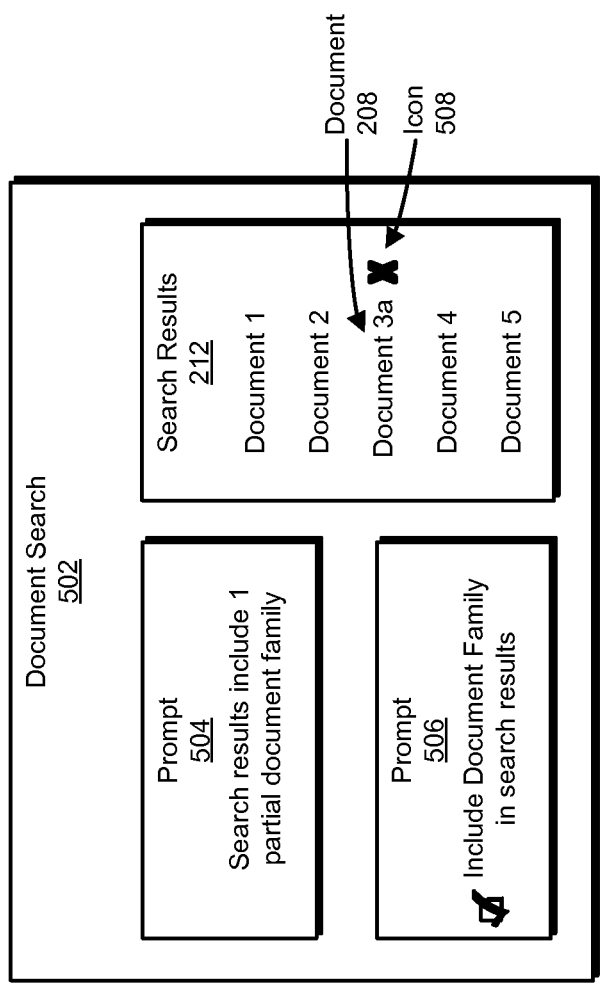
FIG. 5 is an additional illustration of an exemplary document search.

FIG. 5 illustrates an additional exemplary document search 502. In this example, prompt 504 is displayed to the user after the user performs the search and after determination module 104 has determined that search results 212 contain the partial document family. As shown in FIG. 5, prompt 504 may notify the user that search results 212 include one partial document family. Also as shown in FIG. 5, prompt 506 may allow the user to include the entire document family within search results 212. For example, by checking the box in prompt 506, the user may select to expand search results 212 to include the remaining documents within the document family not currently included within search results 212.

In some examples, while search results 212 may contain multiple partial document families, the user may only wish to expand one or a few specific document families. As such, presentation module 106 may allow the user to expand individual document families. For example, presentation module 106 may indicate to the user that an individual document within search results 212 is part of a partial document family, such as by displaying an icon 508 next to the document that represents the partial document family. Notably, the term "icon," as used herein, generally refers to any image or graphical output that may designate a document, a document family, search results, and/or properties of one of these (e.g., the property of being updated and/or the property of containing a partial document family).

As shown in FIG. 5, search results 212 may contain document 3a that is part of a partial document family. Presentation module 106 may indicate that document 3a represents a partial document family by displaying icon 508 next to document 3a. In addition, the user may select to expand the document family associated with document 3a, such as by clicking on icon 508, by indicating that the document family should be expanded within an additional prompt, and/or by any other suitable input procedure.

Returning to FIG. 3, at step 306 one or more of the systems described herein may determine that the user has selected to include the document family associated with the document. For example, determination module 104 may, as part of computing device 202 in FIG. 2, determine that the user has selected to include document family 210 associated with document 208.

The systems described herein may determine that the user has selected to include the document family associated with the document in a variety of ways. In some examples, determination module 104 may determine that the user has selected to include each document family associated with each search result. For example, prior to the user performing the search, presentation module 106 may have displayed a prompt to the user allowing the user to choose to include each document family associated with each search result. Specifically, referring to the example of FIG. 4, presentation module 106 may have displayed prompt 404 to the user. Determination module 104 may then determine that the user selected, such as by checking the box within prompt 404, to include each document family associated with each search result.

In addition, determination module 104 may determine that the user has selected to include each document family associated with each search result after the user has performed the search. For example, after the user performed the search, presentation module 106 may have displayed a prompt to the user allowing the user to choose to update search results 212 by expanding each partial document family included within search results 212. Referring to the example of FIG. 5, presentation module 106 may have displayed prompt 506 to the user. Determination module 104 may then determine that the user selected, such as by checking the box within prompt 506, to include each document family associated with each search result.

Alternatively, determination module 104 may determine that the user has selected to expand one (or multiple) individual partial document families included within search results 212. For example, after the user performed the search, presentation module 106 may have referenced the partial document family within search results 212 and/or displayed a prompt to the user allowing the user to choose to expand the individual partial document family. Referring to the example of FIG. 5, presentation module 106 may have displayed icon 508 next to document 3a. Determination module 104 may then determine that the user selected, such as by clicking icon 508, to expand the partial document family.

Returning to FIG. 3, at step 308 one or more of the systems described herein may include the document family in the search results in response to determining that the user has selected to include the document family associated with the document. For example, inclusion module 108 may, as part of computing device 202 in FIG. 2, include document family 210 in search results 212 in response to determination module 104 determining that the user has selected to include document family 210 associated with document 208.

The systems described herein may include the document family in the search results in a variety of ways. For example, if determination module 104 determined that the user has selected to include each document family associated with each search result, inclusion module 108 may include, within search results 212, each document family associated with each search result. As shown in FIG. 4, if the user selected to include all the document families in search results 212 by checking the box in prompt 404, determination module 104 may determine that document 3a within search results 212 represents a partial document family and therefore inclusion module 108 may include the remaining documents (i.e., document 3b, document 3c, and document 3d) within the document family associated with document 3a. In this example, inclusion module 108 may include documents 3b-3d within search results 212 before search results 212 are initially displayed to the user. In other words, inclusion module 108 may automatically include the document families in search results 212 without requiring the user to manually update search results 212 in order to view the requested document families.

Figure 6:
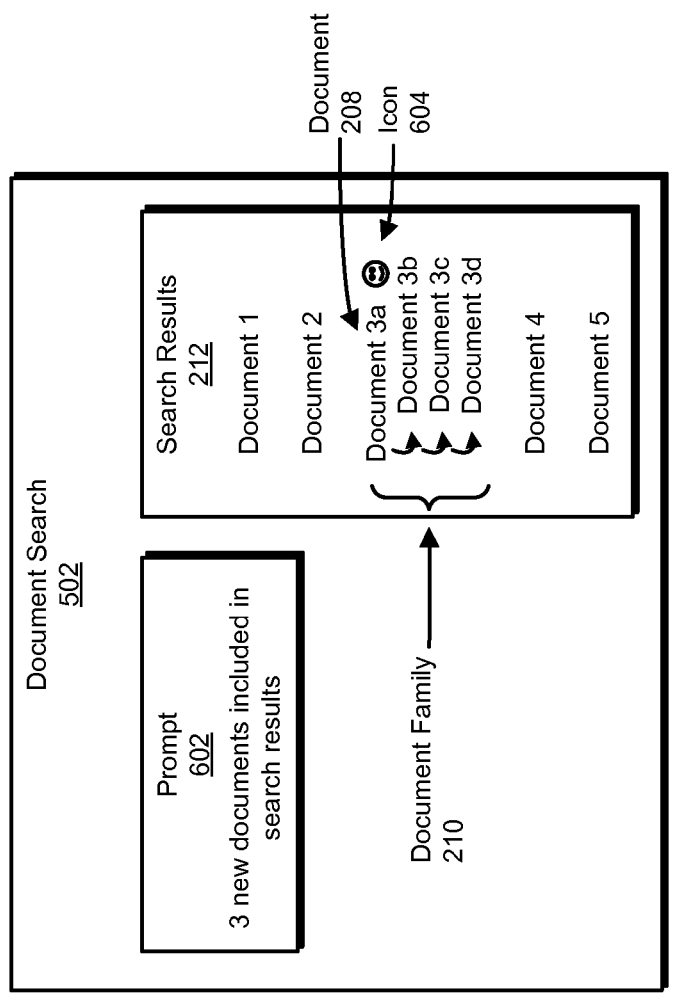
FIG. 6 is an additional illustration of an exemplary document search.

In some embodiments, if determination module 104 determined that the user has selected to include one or more document families associated with a search result that represents a partial document family (e.g., by checking the box in prompt 506 or by clicking icon 508), inclusion module 108 may update search results 212 to include the entire document family associated with the partial document family. As an example, FIG. 6 shows document search 502 after the user has selected to update search results 212 by including the entire document family associated with the partial document family. As shown in FIG. 6, inclusion module 108 may update search results 212 to include documents 3b-3d in response to determining that the user selected to include the entire document family within search results 212. In this example, inclusion module 108 may include the document family in search results 212 after search results 212 are initially displayed to the user. In other words, inclusion module 108 may wait to include the entire document family associated with the partial document family found in search results 212 until after the user has analyzed search results 212 and determined that the entire document family may be useful (e.g., by selecting to include the individual document family for the document from among the displayed search results).

In addition to updating search results 212, inclusion module 108 may display a message to the user notifying the user of the number of new documents included in search results 212 after the search results were updated. For example, inclusion module 108 may display prompt 602 in FIG. 6 to notify the user that 3 new documents (i.e., documents 3b-3d) were included in search results 212 after the user selected to include the entire document family within search results 212. Furthermore, if the user selected to expand the partial document family included within search results 212, such as by clicking on icon 508 in FIG. 5, inclusion module 108 may replace icon 508 with an icon that represents the entire document family. For example, inclusion module 108 may display icon 604 next to document 3a within search results 212, instead of displaying icon 508. Providing such notifications and icons may enhance the user's search experience by clearly indicating when and/or how many new documents were added to the search results.

Moreover, inclusion module 108 may similarly update not just the number of documents in the search results, but any other property or count of the entire search results or any subset of the search results. For example, in addition to including document families within search results 212, the systems described herein may display to the user categories with which each search result is associated. For example, a search engine may filter and/or label each document that may be returned as a search result in order to allow a user to most effectively sort and analyze search results. In some examples, a document may be categorized based on when the document was created, the length of the document, an author and/or origin of the document, a semantic content of the document, and/or any other suitable categorization.

In some embodiments, inclusion module 108 may display to the user one predetermined category (or multiple predetermined categories) with which search results 212 are associated. For example, inclusion module 108 may display a list of potential categories before the user performs the search. Additionally or alternatively, inclusion module 108 may display to the user the number of found documents that fall into each predetermined category after the user performs the search. For example, determination module 104 and/or a search engine performing the search may analyze each document within search results 212 in order to display to the user how many documents fall into each category.

Furthermore, inclusion module 108 may update the number of documents that fall into each category after the user selects to expand a partial document family within search results 212. For example, the user may have performed a search without selecting to include all the document families within the search results. Inclusion module 108 may then display to the user the number of found documents that fall into each category. However, determination module 104 may then determine that the user has selected to expand a partial document family and therefore determination module 104 may determine that the number of found documents that fall into each category is inaccurate based on the search results having been updated. In response to the determination that the number of found documents that fall into each category is inaccurate, inclusion module 108 may update the number of found documents that fall into each category to represent the newly-added documents.

In some examples, inclusion module 108 may automatically update the number of found documents that fall into each category in response to determining that the number is inaccurate. Alternatively, inclusion module 108 may display a prompt to the user allowing the user to select to update the number of found documents that fall into each category.

As first mentioned above, in some examples, including entire document families within the search results may be performed in part by creating and/or expanding one or more data maps. For example, creation module 112 and expansion module 114 may develop data maps that represent the search results and/or the requested document families, as will be discussed further for FIG. 7 and corresponding FIGS. 8 and 9.

Figure 7:
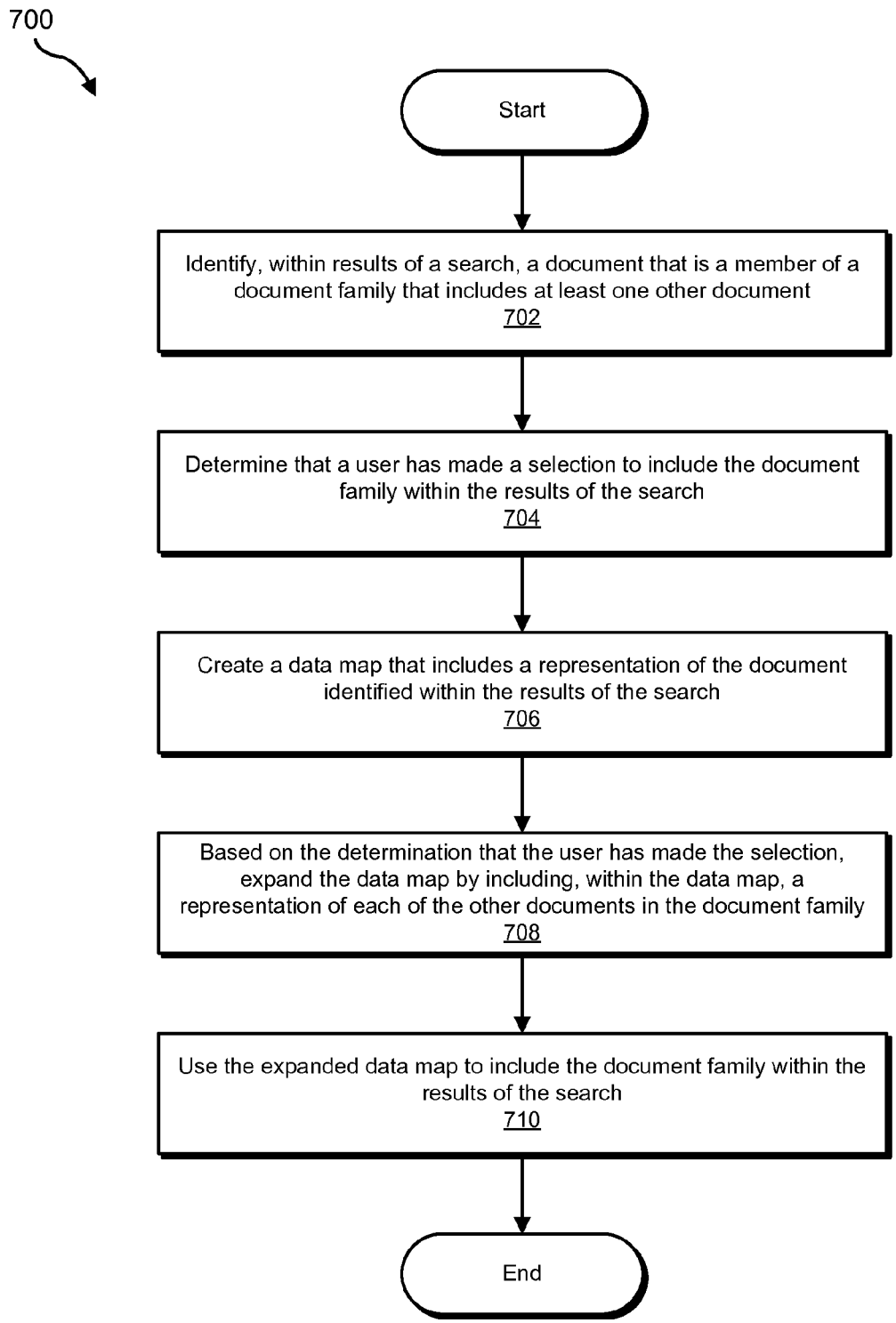
FIG. 7 is an additional flow diagram of an exemplary method for expanding search results.

FIG. 7 is a flow diagram of an exemplary computer-implemented method 700 for expanding search results. The steps shown in FIG. 7 may be performed by any suitable computer-executable code and/or computing system. In some embodiments, the steps shown in FIG. 7 may be performed by one or more of the components of system 100 in FIG. 1, system 200 in FIG. 2, computing system 1010 in FIG. 10, and/or portions of exemplary network architecture 1100 in FIG. 11.

As illustrated at step 702, one or more of the systems described herein may identify, within results of a search, a document that is a member of a document family that includes another document (or multiple other documents). For example, identification module 110 may, as part of computing device 202 in FIG. 2, identify, within search results 212, document 208 that is a member of document family 210.

The systems described herein may identify the document that is a member of the document family in a variety of ways. For example, identification module 110 may identify one or more documents from within search results 212 that are a member of a document family that is not fully represented within search results 212 (i.e., one or more members of the document family that are not included within search results 212). In some examples, document 208 may correspond to a single document within a document family. In other examples, document 208 may correspond to multiple documents from within the same document family or multiple documents from within multiple document families. In addition, document 208 may correspond to each document within search results 212 that is a member of a partial document family.

In some embodiments, identification module 110 may identify document 208 after determination module 104 has determined that a user performed a document search, as discussed previously in connection with FIG. 3 and corresponding FIGS. 4-6. For example, identification module 110 may identify document 208 at any point after search results 212 have been identified. In some embodiments, identification module 110 may identify document 208 after a user has entered search criteria into an input field within a GUI of a search engine. For example, identification module 110 may identify document 208 after the search engine has identified search results 212 from within database 120 but before search results 212 are displayed to a user. In an additional example, identification module 110 may identify document 208 after search results 212 have been displayed to the user. In general, identification module 110 may identify a document either before, or after, determination and/or output of search results 212, based on predetermined settings, heuristics, or formulas (i.e., that identify document 208 from within a set of documents) and/or user input designating document 208.

Returning to FIG. 7, at step 704 one or more of the systems described herein may determine that a user has made a selection to include the document family within the results of the search. For example, determination module 104 may, as part of computing device 202 in FIG. 2, determine that the user has made the selection to include document family 210 within search results 212.

The systems described herein may determine that the user has made the selection to include the document family within the results of the search in a variety of ways. In some embodiments, determination module 104 may determine that the user has selected to include each document family associated with each search result. For example, determination module 104 may determine that the user has selected to include each document family before the user performed the search and/or before search results 212 are displayed to the user. In an additional example, determination module 104 may determine that the user has selected to include each document after search results 212 are displayed to the user.

In some embodiments, determination module 104 may determine that the user has made the selection to include the document family within search results 212 by selecting to expand one or more partial document families represented in search results 212. For example, determination module 104 may determine that a search result represents a partial document family and then determine that the user has selected to include the entire document family associated with the document in search results 212. In some examples, identification module 110 and determination module 104 may perform steps 702 and 704 through the same action or actions (e.g., the same input or mouse click from a user identifying document 208 and requesting expansion of corresponding document family 210).

In the above examples, presentation module 106 may present various options to the user allowing the user to choose when and/or which document families to include within search results 212, as discussed previously in connection with FIG. 3 and corresponding FIGS. 4-6.

Returning to FIG. 7, at step 706 one or more of the systems described herein may create a data map that includes a representation of the document identified within the results of the search. For example, creation module 112 may, as part of computing device 202 in FIG. 2, create data map 126 that includes the representation of document 208.

The systems described herein may create the data map in a variety of ways. In some examples, creation module 112 may create data map 126 based on how the user selected to include the document family within search results 212. For example, if determination module 104 determined that the user has made the selection to include each document family associated with each search result, creation module 112 may create data map 126 to represent each document identified in search results 212. In addition, if the user selected to include each document family before performing the search, determination module 104 may perform and/or direct a search engine to perform the search, and creation module 112 may create data map 126 before search results 212 are displayed to the user. As will be explained in greater detail below, data map 126 may then be expanded and directly used to include each document family associated with each search result within search results 212.

Figure 8:
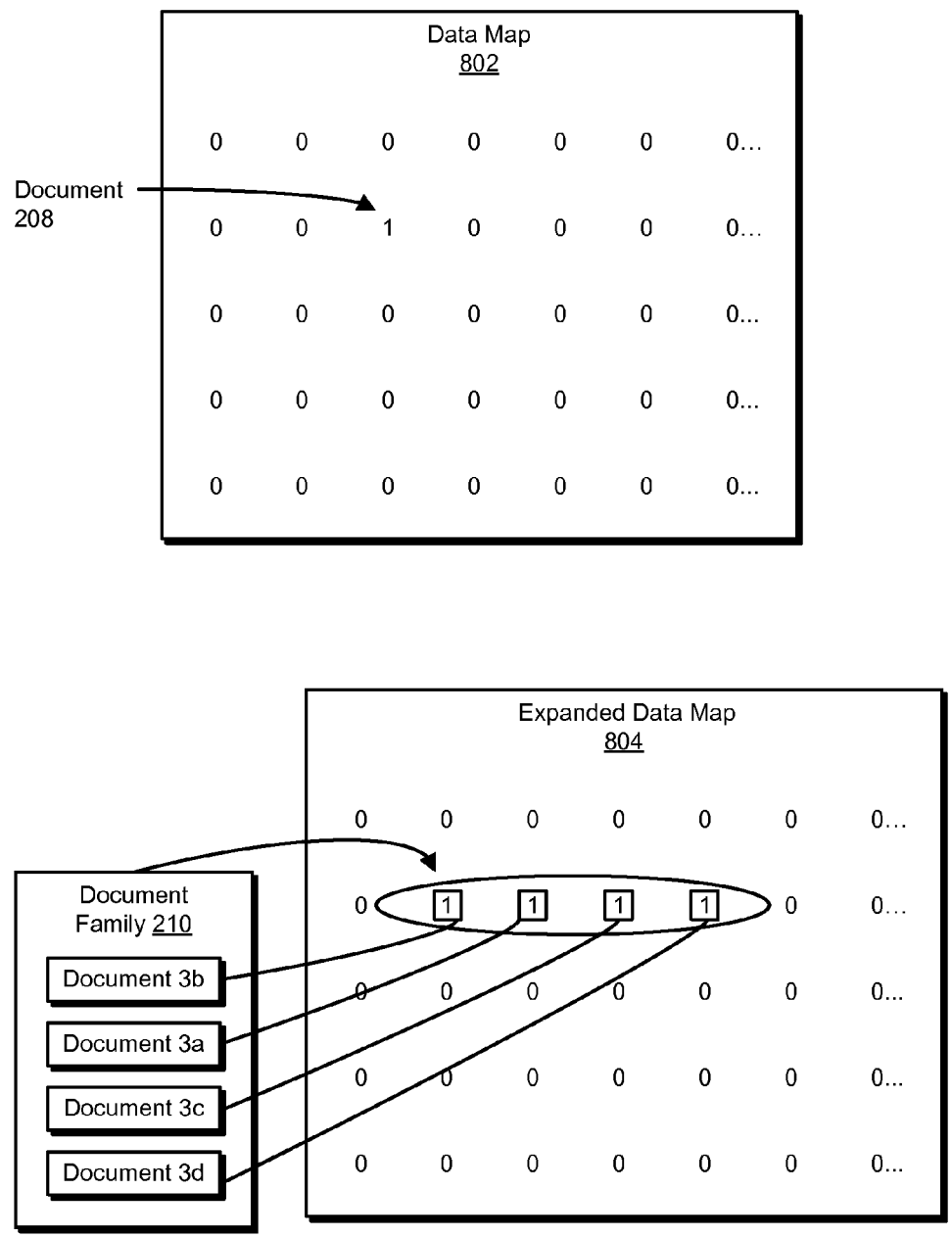
FIG. 8 is an illustration of exemplary data maps.

Alternatively, in some examples, if the user selected to expand one or more document families after performing the search, creation module 112 may create data map 126 to include each of the selected documents. For example, FIG. 8 shows an exemplary data map 802. In this example, creation module 112 may create data map 802 to represent only document 208 (e.g., if document 208 represents the only partial document family the user wishes to expand). As will be explained in greater detail below, data map 802 may be used along with one or more additional data maps in order to include each requested document family within search results 212.

As explained previously, in some examples, data map 126 may represent each document within database 120 at a particular offset within data map 126. For example, in order to create data map 126, creation module 112 may first identify and/or extract a unique identifier associated with each document to be represented on data map 126. In some embodiments, these unique identifiers may be stored in database 120 and/or in any other suitable data structure. After identifying each unique identifier, creation module 112 may convert each unique identifier to a corresponding offset within data map 126.

In some examples, data map 126 may be a bitmap (e.g., data map 126 may store a single bit at each offset corresponding to a found document). In these examples, creation module 112 may represent each document within data map 126 by toggling the bit at the corresponding offset on data map 126. For example, each document may be represented by a binary logical high (i.e., "1") or a binary logical low (i.e., "0"). Generally, creation module 112 may update any number of bits stored at the corresponding offset on data map 126 in order to indicate that the document is and/or should be displayed to the user (or is included within search results 212, either before or after expansion/updating of search results 212).

Returning to FIG. 7, at step 708 one or more of the systems described herein may expand the data map by including, within the data map, a representation of each of the other documents in the document family based on the determination that the user has made the selection. For example, expansion module 114 may, as part of computing device 202 in FIG. 2, expand data map 126 by including, within data map 126, a representation of each of the other documents in document family 210.

The systems described herein may expand the data map in a variety of ways. In some examples, expansion module 114 may expand data map 126 based on how the user selected to include the document family within search results 212 and/or the documents currently included in data map 126. For example, if the user selected to include each document family associated with each search result, creation module 112 may have created data map 126 to represent each document within search results 212. In this example, expansion module 114 may then expand data map 126 to include each remaining document within every document family that includes any document within search results 212. As a result of this expansion, expanded data map 126 may include each document (e.g., each of search results 212 and every associated document family) that the user wishes to view.

Alternatively, if the user selected to expand one or more partial document families after performing the search, creation module 112 may have created data map 126 to include each document selected by the user. Expansion module 114 may then expand data map 126 to include each remaining document within the document family or families associated with the selected documents. Referring to the example of FIG. 8, data map 802 may initially only indicate document 208 as marked for expansion (e.g., as the only document for which a user selected to include corresponding document family 210 within search results 212). Expansion module 114 may then expand data map 802 into expanded data map 804. As shown in FIG. 8, expanded data map 804 may include three additional documents that are members of document family 210. As a result of this expansion, expanded data map 804 may include (in addition to document 208) each document that is part of a document family the user wishes to view that was not originally included in search results 212.

According to one specific algorithm, expansion module 114 may (A) identify each document corresponding to each toggled bit (or set of bits) on data map 126, (B) identify a corresponding family (if any) for each of those identified documents, (C) identify each (or some) remaining documents within each document family, (D) identify offset and/or data map location information for each of the identified remaining documents, and (E) finally toggle each bit (or set of bits) corresponding to each of the identified remaining documents (e.g., ensuring that the bit(s) are set if not already set). Moreover, in some examples, expansion module 114 may expand data map 126 with a process similar to the process used by creation module 112 to create data map 126. For example, in order to expand data map 126, expansion module 114 may first identify each of the documents within the document family that are to be included within search results 212. Expansion module 114 may then identify and/or extract a unique identifier associated with each document to be added to data map 126. After identifying each unique identifier, expansion module 114 may convert each unique identifier to a corresponding offset within data map 126 and then represent each document at the corresponding offset. As a result of this expansion (using this or any functionally equivalent or suitable algorithm), expanded data map 126 may represent each entire document family that the user wishes to view (in FIG. 8, just document family 210). However, expanded data map 804 may not represent every other document within search results 212. For example, expanded data map 804 may not include any document (a) that is not part of a document family, (b) that is associated with a document family that is already fully represented within search results 212, and/or (c) that is part of a partial document family that the user (or predefined software, settings, and/or rules) does not wish to expand.

In some examples, expansion module 114 may create an additional data map that includes a representation of each document within search results 212. Expansion module 114 may then combine expanded data map 126 (e.g., data map 804) with the additional data map. As a result of this combination, the combined data map may include each document (e.g., every selected document family and each of search results 212) that the user wishes to view. In other examples, such as those where the user requests to expand partial document families for every search result in original search results 212, the use of the additional data map may be redundant.

Figure 9:
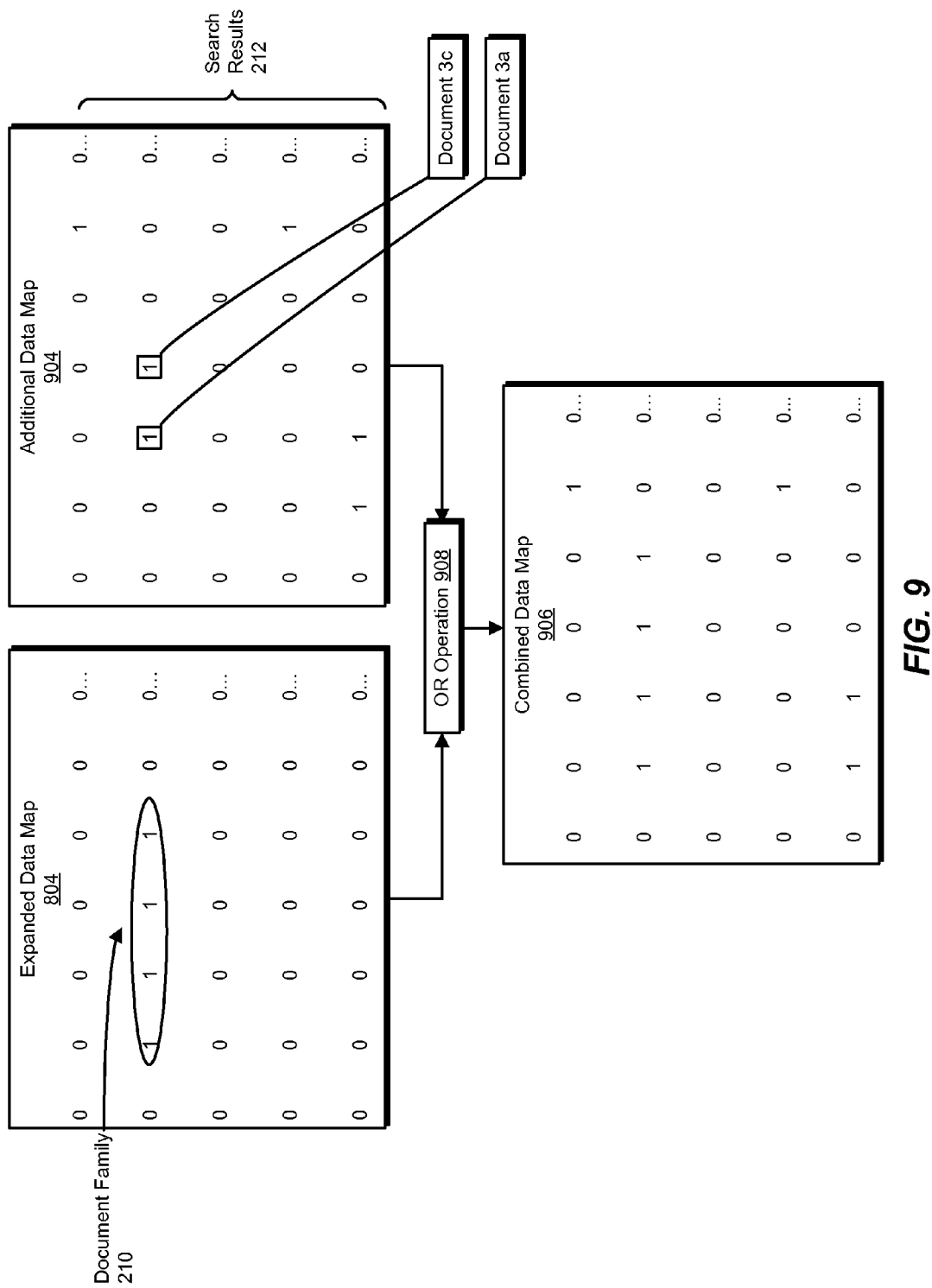
FIG. 9 is an additional illustration of exemplary data maps.

FIG. 9 illustrates an example of producing a combined data map. For example, as discussed above, expanded data map 804 may represent each document within document family 210. An additional data map 904 may represent each document within search results 212. Furthermore, combined data map 906 may represent the combination of expanded data map 804 and additional data map 904. In this example, expanded data map 804 and additional data map 904 only overlap with document 3*a* (i.e., document 208) and one other member (e.g., document 3*c*) of the partial document family associated with document 3*a* that happened to be included in search results 212. In some examples, however, expanded data map 804 and additional data map 904 may include even further overlap between documents (e.g., if search results 212 contain even more members of a partial document family and/or if the user selected to expand multiple document families). Notably, in the example of FIG. 9, the user may have alternatively selected to include the document family associated with document 3*c* and/or may have selected to include the document families associated with both documents 3*a* and 3*c*. Because document 3*a* and document 3*c* are members of the same document family, selecting to expand one or both of their associated families may result in the same document family (e.g., document family 210) being fully represented within search results 212.

Expanded data map 804 and additional data map 904 may be combined in any way such that combined data map 906 includes each document that the user wishes to view. For example, expansion module 114 may produce combined data map 906 by performing an OR operation 908 on expanded data map 804 and additional data map 904. In this way, each document that is included within either data map will be represented in the combined data map (including any documents that overlap between the expanded and additional data maps, such as document 3*a* and document 3*c* shown in additional data map 904 in FIG. 9).

Returning to FIG. 7, at step 710 one or more of the systems described herein may use the expanded data map to include the document family within the results of the search. For example, inclusion module 108, as part of computing device 202 in FIG. 2, may use expanded data map 126 to include document family 210 within search results 212.

The systems described herein may use the expanded data map to include the document family within the results of the search in a variety of ways. For example, as explained above, expanded data map 126 may represent and/or may be used to create a data map that represents each document that the user wishes to view in search results 212. Once expansion module 114 has produced such a data map, inclusion module 108 may display each document or search results indicating each document, as represented in the data map, to the user.

For example, if the user selected to include each document family associated with each search result within search results 212, expansion module 114 may have produced an expanded data map 126 that includes each search result as well as every document within each associated document family. Furthermore, expansion module 114 may have expanded data map 126 before search results 212 are displayed to the user. Therefore, inclusion module 108 may use expanded data map 126 to display each associated document family within search results 212.

Alternatively, if the user selected to expand one or more partial document families within search results 212 after viewing search results 212, expansion module 114 may have produced a combined data map that includes each original search result as well as every document within each requested document family. Inclusion module 108 may therefore use the combined data map to update search results 212.

As described above, by allowing a user to view all document families associated with found documents, the disclosed systems and methods may provide more comprehensive, robust search results. In addition, the disclosed systems and methods may allow a user to customize and enhance results of a search by giving users the option to expand individual document families. In general, the disclosed systems and methods provide increased flexibility and user control in order to optimize the documents displayed to a user as the results of a search.

Figure 10:
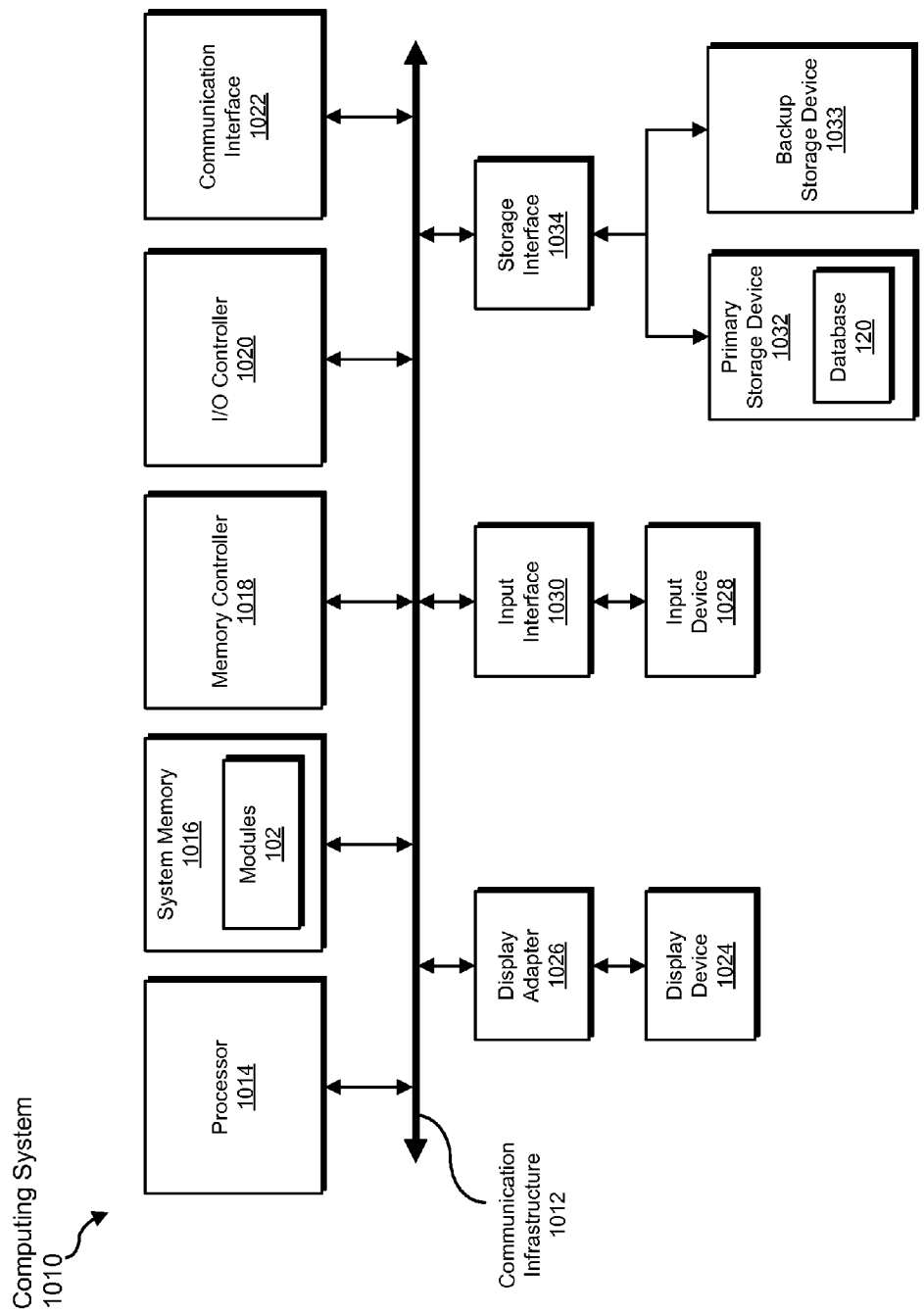
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. For example, all or a portion of computing system 1010 may perform and/or be a means for performing, either alone or in combination with other elements, one or more of the steps described herein (such as one or more of the steps illustrated in FIG. 3). All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of physical processing unit (e.g., a hardware-implemented central processing unit) capable of processing data or interpreting and executing instructions. In certain embodiments, processor 1014 may receive instructions from a software application or module. These instructions may cause processor 1014 to perform the functions of one or more of the exemplary embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In certain embodiments, exemplary computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also include at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device.

As illustrated in FIG. 10, exemplary computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, database 120 from FIG. 1 may be stored in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an Application Specific Integrated Circuit (ASIC) adapted to implement one or more of the exemplary embodiments disclosed herein.

Figure 11:
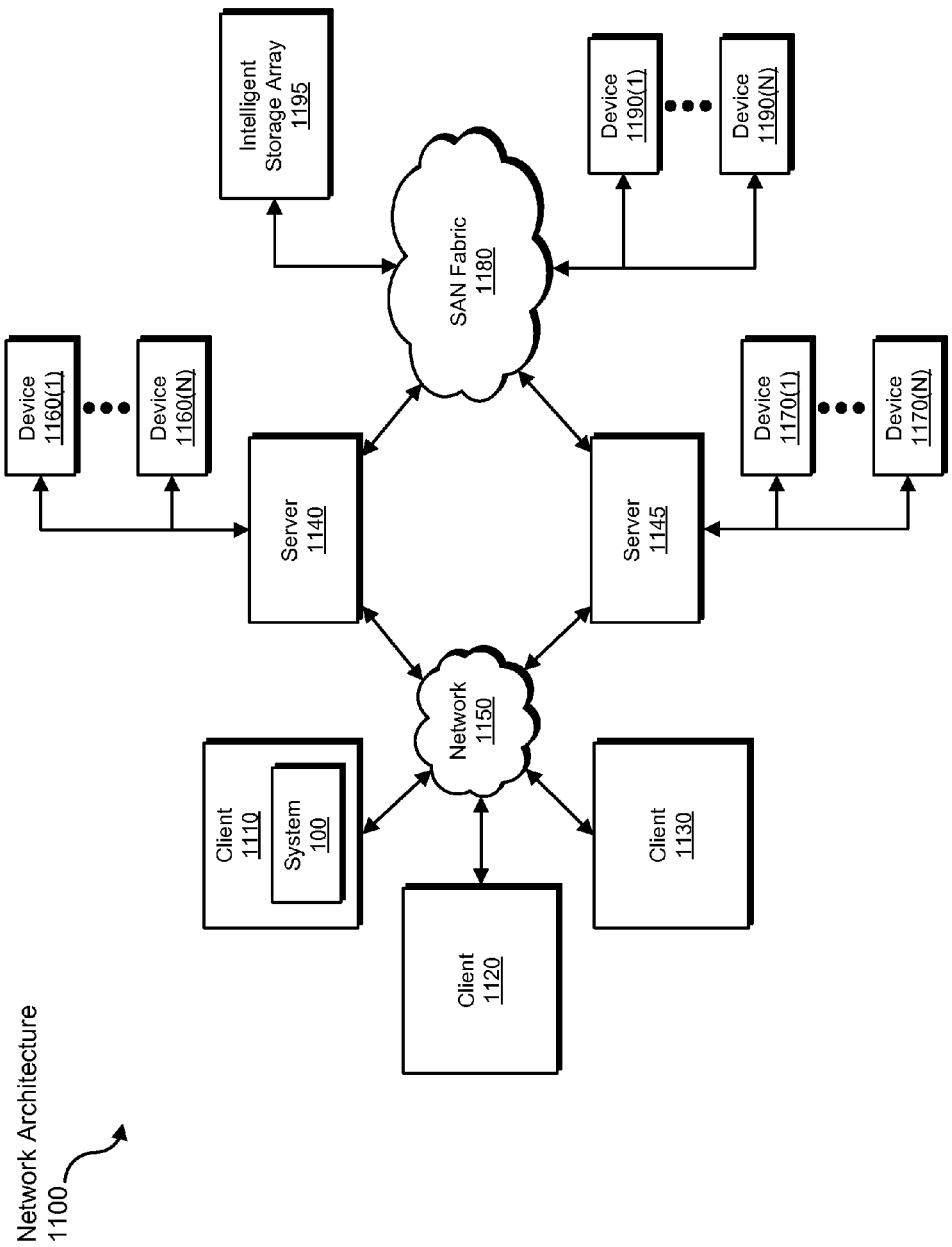
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the steps disclosed herein (such as one or more of the steps illustrated in FIG. 3). All or a portion of network architecture 1100 may also be used to perform and/or be a means for performing other steps and features set forth in the instant disclosure.

Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 100 from FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N)

and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an exemplary method for expanding search results.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to perform a document search, transform the request, output a result of the transformation to a storage or output device (e.g., a display), use the result of the transformation to expand search results, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for expanding search results, at least a portion of the method being performed by a computing device comprising at least one processor, the method comprising:
   identifying, within results of a search, a document that is a member of a document family that includes at least one other document;
   determining that a user has made a selection to include, within the results of the search, the document family;
   creating a data map that includes a representation of the document identified within the results of the search at least in part by identifying a unique identifier associated with the document that corresponds to an offset within the data map and representing the document by toggling a bit at the corresponding offset on the data map;
   based on the determination that the user made the selection, expanding the data map by including, within the data map, a representation of each of the at least one other document in the document family;
   using the expanded data map to include the document family within the results of the search.

2. The method of claim 1, wherein:
   determining that the user made the selection to include the document family in the results of the search comprises determining that the user made the selection, before performing the search, to include each document family that includes any document found in the search;
   expanding the data map comprises including, within the data map, each document family that includes any document found in the search;
   using the expanded data map to include the document family within the results of the search comprises including, within the results of the search, each document family represented on the data map.

3. The method of claim 1, wherein determining that the user has made the selection to include the document family in the results of the search comprises:
   determining that a search result represents a partial document family;
   determining that the user has selected, after performing the search, to expand the partial document family found in the search.

4. The method of claim 3, wherein the document family comprises the partial document family.

5. The method of claim 1, wherein:
   expanding the data map comprises:
      creating an additional data map that includes a representation of each document identified within the results of the search;
      combining the expanded data map and the additional data map to create a combined data map that includes a representation of each document within each document family that contains any document within the results of the search;
   using the data map to include the document family within the results of the search comprises updating the results of the search by including, within the results of the search, each document represented in the combined data map.

6. The method of claim 5, wherein combining the data map and the additional data map comprises performing a bitwise OR operation on the data map and the additional data map.

7. The method of claim 1, the document family is stored within an e-discovery platform.

8. The method of claim 1, wherein expanding the data map comprises:
   identifying each of the at least one other document within the document family;
   identifying, for each of the at least one other document within the document family, a unique identifier that corresponds to an offset within the data map;
   toggling a bit at the corresponding offset for each of the at least one other document within the document family.

9. A system for expanding search results, the system comprising:
   an identification module that identifies, within results of a search, a document that is a member of a document family that includes at least one other document;
   a determination module that determines that a user has made a selection to include, within the results of the search, the document family;
   a creation module that creates a data map that includes a representation of the document identified within the results of the search at least in part by identifying a unique identifier associated with the document that corresponds to an offset within the data map and representing the document by toggling a bit at the corresponding offset on the data map;
   an expansion module that expands the data map by including, within the data map, a representation of each of the at least one other document in the document family based on the determination that the user made the selection;
   an inclusion module that uses the expanded data map to include the document family within the results of the search;
   at least one processor that executes the identification module, the determination module, the creation module, the expansion module, and the inclusion module.

10. The system of claim 9, wherein:
    the determination module determines that the user made the selection to include the document family in the results of the search by determining that the user made the selection, before performing the search, to include each document family that includes any document found in the search;
    the expansion module expands the data map by including, within the data map, each document family that includes any document found in the search;
    the inclusion module uses the expanded data map to include the document family within the results of the search by including, within the results of the search, each document family represented on the data map.

11. The system of claim 9, wherein the determination module determines that the user has made the selection to include the document family in the results of the search by:
    determining that a search result represents a partial document family;
    determining that the user has selected, after performing the search, to expand the partial document family found in the search.

12. The system of claim 11, wherein the document family comprises the partial document family.

13. The system of claim 9, wherein:
    the expansion module expands the data map by:
    creating an additional data map that includes a representation of each document identified within the results of the search;
    combining the expanded data map and the additional data map to create a combined data map that includes a representation of each document within each document family that contains any document within the results of the search;
    the inclusion module uses the data map to include the document family within the results of the search by updating the results of the search by including, within the results of the search, each document represented in the combined data map.

14. The system of claim 13, wherein the expansion module combines the data map and the additional data map by performing a bitwise OR operation on the data map and the additional data map.

15. The system of claim 9, wherein the identification module identifies the document within an e-discovery platform.

16. The system of claim 9, wherein the expansion module expands the data map by:
    identifying each of the at least one other document within the document family;
    identifying, for each of the at least one other document within the document family, a unique identifier that corresponds to an offset within the data map;
    toggling a bit at the corresponding offset for each of the at least one other document within the document family.

17. A non-transitory computer-readable medium comprising one or more computer-executable instructions that, when executed by at least one processor of a computing device, cause the computing device to:
    identify, within results of a search, a document that is a member of a document family that includes at least one other document;
    determine that a user has made a selection to include, within the results of the search, the document family;
    create a data map that includes a representation of the document identified within the results of the search at least in part by identifying a unique identifier associated with the document that corresponds to an offset within the data map and representing the document by toggling a bit at the corresponding offset on the data map;
    based on the determination that the user made the selection, expand the data map by including, within the data map, a representation of each of the at least one other document in the document family;
    use the expanded data map to include the document family within the results of the search.

18. The computer-readable medium of claim 17, wherein the computer-executable instructions further cause the computing device to:
    determine that the user made the selection to include the document family in the results of the search by determining that the user made the selection, before performing the search, to include each document family that includes any document found in the search;
    expand the data map by including, within the data map, each document family that includes any document found in the search;
    use the expanded data map to include the document family within the results of the search by including, within the results of the search, each document family represented on the data map.

19. The computer-readable medium of claim 17, wherein the computer-executable instructions further cause the computing device to determine that the user has made the selection to include the document family in the results of the search by:
   determining that a search result represents a partial document family;
   determining that the user has selected, after performing the search, to expand the partial document family found in the search.

20. The computer-readable medium of claim 17, wherein the computer-executable instructions further cause the computing device to:
   expand the data map by:
      creating an additional data map that includes a representation of each document identified within the results of the search;
      combining the expanded data map and the additional data map to create a combined data map that includes a representation of each document within each document family that contains any document within the results of the search;
   use the data map to include the document family within the results of the search comprises updating the results of the search by including, within the results of the search, each document represented in the combined data map.

* * * * *

UNITED STATES PATENT AND TRADEMARK OFFICE
CERTIFICATE OF CORRECTION

PATENT NO. : 9,436,743 B1
APPLICATION NO. : 14/229398
DATED : September 6, 2016
INVENTOR(S) : Michael Coyle et al.

Page 1 of 1

It is certified that error appears in the above-identified patent and that said Letters Patent is hereby corrected as shown below:

In the Claims

Claim 7, Column 25, Line 6 should read:
wherein the document family is stored within an e-discovery Signed and Sealed this
Eleventh Day of April, 2017

Michelle K. Lee
*Director of the United States Patent and Trademark Office*